Patented Mar. 30, 1937

2,075,333

UNITED STATES PATENT OFFICE 2,075,333

TREATMENT OF PAPER

James Augustus Arvin, Wilmington, Del., assignor to E. I. du Pont de Nemours & Company, Wilmington, Del., a corporation of Delaware No Drawing. Application March 3, 1934, Serial No. 713,945

5 Claims. (Cl. 91—68)

This invention relates to the art of water-proofing and sizing of porous bodies, and more particularly to the treatment of paper products.

In my co-pending application Serial No. 651,634 filed January 13, 1933, of which this application is a continuation in part, I have disclosed and claimed new synthetic resins and have also disclosed the manufacture of water-proof materials by the treatment of fabrics, paper, etc. with these resins. The present invention is concerned specifically with the products obtained by the impregnation, coating, sizing, glazing or waterproofing of porous materials, and particularly to the treatment of paper for these purposes.

This invention has as an object the manufacture of new and useful paper products. A further object is the production of new and useful waterproofed papers. A further object is the production of paper products which are chemically inert, transparent, water-resistant, oil and grease-proof, and which have markedly improved wet and dry strength.

These objects are accomplished by the treatment of paper in the manner specifically disclosed hereinafter with synthetic resins of the type described in the above identified application.

These synthetic resins are the reaction products of substantially unpolymerizable monomeric polyhydric phenols and polyhalides whose halogen atoms are attached to aliphatic carbon atoms. The halides are organic compounds having at least two carbon atoms and at least two reactive halogen atoms, the latter all being attached to different carbon atoms. The latter carbons must be joined to other atoms by single bonds only. The resins are best made by condensing the alkali or alkaline earth metal of the polyhydric phenol with the polyhalide.

The following is the preferred general method for making these resins: The polyhydric phenol is mixed with an aqueous solution of the theoretical or a slightly excess quantity of alkali and heated at a relatively high temperature, above 70° C. and preferably above 100° C., but below the decomposition temperatures of the ingredients, with a chemically equivalent amount of the polyhalide. The apparatus preferably consists of a vessel fitted with a thermometer, reflux condenser, and a stirrer designed to sweep the sides and bottom of the vessel. Heating is continued until the desired state of condensation is obtained or until as much of the phenol and halide are reacted as possible. The phenol is largely reacted when the amount of acid to neutralize a definite weight sample becomes essentially constant; where the theoretical amount of alkali was used originally, the final product is nearly neutral. (This method of following the progress of the resinification, however, is sometimes only approximate since part of the alkali may be used up in the hydrolysis of the polyhalide, a side reaction which does not contribute to the resinification.) Tests can be made for uncombined halide by distilling a few drops from the reaction vessel (when the halide is volatile). If this distillate is cloudy, some of the halide is uncombined and refluxing is continued. When the distillate is clear, the water can be distilled off without loss of halide; this will then permit the use of higher temperatures in the later stages of the reaction with a resultant decrease in time of preparation. Further heating after the distillate becomes clear is generally necessary, inasmuch as this "clear" point only shows that essentially all the halide has been combined by the elimination of at least one of its halogen atoms, but not necessarily all of them. The final reaction mass is very viscous, also opaque because of occluded salt. When it has reached the desired consistency, the hot mass is poured into a steam-jacketed Werner-Pfleiderer type mixer and washed with small portions of dilute hydrochloric acid and finally with water to remove the salt. The resin is then dried, either in vacuo or at atmospheric pressure, for several hours at temperatures above its melting point, e. g., in the range 100–150° C. Clear tough resins are obtained whose hardness will depend largely on the temperature, time of reaction, and certain other details.

A resin useful in the practice of this invention may be made as indicated below:

| | Parts |
|---|---|
| Di(4-hydroxyphenyl) dimethylmethane (M. P. 157° C.) | 456 |
| Dichlorodiethyl ether | 286 |
| Water | 450 |
| Sodium hydroxide (50%) | 326 |

The above mixture is refluxed in an atmosphere of nitrogen or water vapor for 10–15 hours with stirring or until a few drops of clear distillate shows that there is no remaining free halide. The water is distilled off over a period of two hours, the temperature finally being carried to 225–230° C. and maintained at this point for 12 hours. The mass is now very viscous and pasty. It is poured while hot into a steam-jacketed Werner-Pfleiderer mixer, washed three times with water, then with small portions of dilute hydrochloric acid until the washings are acid to Congo red and finally with water again until the washings are substantially free of chloride ion. The product is then dried by heating in vacuo at 120–125° C. for 16 hours. The resin is hard, clear, pale-colored and extremely tough, and is inert to acid, alkali, water and light. It is insoluble in alcohol and aliphatic hydrocarbons, but soluble in toluol, xylol and aromatic esters such as dibutyl phthalate. Films dry to a hard, non-tacky condition in a very few minutes by simple evaporation of solvent; in this respect, the resin resembles cellulose derivatives. The resin does not mix readily with oils and most cellulose derivatives, but is compatible with benzyl cellulose. The resin does not heat-harden (like a phenol-formaldehyde resin) nor dry by oxidation (like a drying oil modified polyhydric alcohol-polybasic acid resin).

Other resins which are particularly suitable for the manufacture of my improved paper products are the following resins prepared from the following ingredients in the manner indicated above:

Di(3-methyl-4-hydroxyphenyl) dimethylmethane and ethylene dichloride.

1,1-di(4-hydroxyphenyl) cyclohexane and $\beta,\beta'$-dichlordiethyl ether.

Di-$\beta$-naphthol and $\beta,\beta'$-dichlorodiethyl ether.

Di-(4-hydroxyphenyl) naphthane-2 and $\beta,\beta'$ dichlordiethyl ether.

Di(4-hydroxynaphthyl) dimethylmethane and $\beta,\beta'$ dichlorodiethyl ether.

In carrying out the present invention the paper is treated with a polyether resin of the kind described above in the form of solutions in organic solvents, aqueous dispersions of the resin or solutions thereof, or hot melts. By the term "treatment" as I use it herein, I mean any process for applying the polyether type resin to the paper, such as sizing, coating, and impregnation processes known to the art. In the practice of the invention I generally prefer to treat the paper with a solution of the polyether resin in an organic solvent by the process known to the art as "tub sizing". The amount of polyether resin to be deposited on the paper is determined to a large extent by the purpose to which the product is to be put and therefore varies within wide limits. The concentration of the polyether resin solution also varies within wide limits. In order to get products having the greatest degree of oil, water, and grease-proofness, it is necessary to treat the paper with a sufficient amount of the polyether resin to give a continuous surface film. The absorbency of the paper determines the amount of resin required to give a continuous surface film; thus, highly absorbent papers require a larger quantity of the polyether resin than less absorbent papers, as for example, glassine paper, parchmentized papers, or papers formed from very highly hydrated stocks. Instead of using solutions in organic solvents for the treatment of the paper, I may to equal advantage use aqueous dispersions of the resins and after the treatment remove the water by drying at elevated temperature. Aqueous emulsions or solutions of the resins in organic solvents may likewise be used.

In general, paper treated by the tub sizing process described above has improved properties with respect to water resistance and wet and dry strength, irrespective of whether the amount of resin deposited on the paper is large or small. However, I generally prefer to saturate the sheet with the polyether resin, because under these conditions I get products having the desired water-resistance, transparency, oil and grease-proofness, etc. However, the use of too much of the resin detracts from the flexibility and the amount used must be properly balanced against flexibility requirements.

If it is desired to coat the paper with the resin without obtaining substantial penetration thereof, I prefer to use the so-called "hot melt" process. In this process, the resin is fused, spread on the paper, excess resin removed with a hot doctor knife or with a heated roll, and the treated product allowed to cool to room temperature. This process is the preferred embodiment of the invention for the preparation of products that are to be used in applications requiring extreme oil, gasoline, and water resistance, but in which pliability is not a primary requirement. A resin particularly suitable in this method is the polyether resin obtainable by the reaction of di(3-methyl-4-hydroxyphenyl) dimethylmethane and $\beta,\beta'$-dichlordiethyl ether in the presence of alkali.

As an alternative, but less desirable process, I may employ the process known to the trade as "beater sizing". In the beater sizing process the pulp is beaten in a paper beater until it is nearly ready to form into a sheet on any standard type of machine. The polyether resin in the form of an aqueous emulsion is then added to the beater, and the beating continued for a sufficient length of time to disperse the emulsion intimately into the pulp. Any of the common size precipitants, as for example alum, is then added to bring about deposition of the polyether resin in finely divided form on the surface of the fibers. The amount of polyether resin to be incorporated into the pulp varies within wide limits, depending upon the purpose to which the paper is to be put.

The aqueous emulsions of the polyether resins may be prepared by any method known to the art, but we generally prefer to prepare these emulsions in a colloid mill. Emulsions of solutions of the resins in organic solvents may be prepared by vigorous agitation of said resin solutions with water containing an emulsifying agent (sodium beta-naphthalene sulfonate).

The following examples are illustrative of the method which may be used in carrying out the invention:

Example I

A sheet of unbeaten kraft paper was drawn through a 1.5% toluene solution of the polyether resin, prepared by the reaction of di(4-hydroxyphenyl) dimethylmethane and $\beta,\beta'$-dichlordiethyl ether in the presence of alkali, then through squeeze rolls to remove excess resin solution from the surface of the paper, and the treated paper dried at 100–110° C. The polyether resin content of the impregnated paper was 2%, based on the dry weight of the fiber.

The water resistance of the sheet, measured by the dry indicator method, was increased from 0 seconds to 75 seconds by application of the resin. The Mullen bursting strength of the dry sheet was increased from 21.4 to 27 and of the wet sheet from 2.6 to 8.9.

Example II

This example illustrates the treatment of the paper by the beater size process. The emulsion used for the impregnation of the pulp was prepared as follows:

To 241 grams of a solution of the following composition:

| | Grams |
|---|---|
| 10% casein in tri-sodium phosphate solution | 12.5 |
| 10% aqueous solution of sodium hydroxide | 1.0 |
| 10% aqueous solution of isopropyl naphthalene sodium sulfonate | 12.5 |
| Distilled water | 215.0 |
| Total | 241.0 | was added in a colloid mill 72 grams of a 33⅓% toluene solution of the polyether resin obtainable by the reaction of di(3-methyl-4-hydroxyphenyl)dimethylmethane and $\beta,\beta'$-dichlordiethyl ether in the presence of alkali, and the mixture circulated through the colloid mill for 4 minutes. The resulting dispersion was stable and had an average particle size of 4 microns.

A beater was charged with a high alpha cellulose content wood pulp, and the pulp beaten until sufficiently hydrated for sheet formation. To the pulp was then added the polyether resin emulsion described above in an amount equal to 2%, based on the weight of the fiber, and the mixture beaten until the emulsion and the pulp were intimately mixed. Alum was then added until the pulp had a pH of 4.8. Sheets were then formed by means of a hand mold, pressed between wool felts, and dried.

The water resistance of the paper formed as described above, measured by the dry indicator method, was 50.7 as compared to 0 for the untreated paper. The Mullen bursting strength of the dry sheet was increased from 21.4 to 23, and of the wet sheet from 2.6 to 5.

Example III

A sheet of high grade rag paper was drawn through a bath containing a 1.5% toluene solution of the polyether resin obtained by the reaction of di(4-hydroxyphenyl)dimethylmethane and $\beta,\beta'$-dichlordiethyl ether in the presence of alkali, then through squeeze rolls to remove excess solution from the surface of the paper, and the sheet dried at room temperature. The treated product was markedly superior to the untreated paper in respect to wrinkling, crumpling, and tearing resistance, and also in respect to water, gasoline, and oil-proofness.

Example IV

A sheet of high grade cotton paper was coated with the polyether resin solution of Example III by brushing said solution onto the surface of the paper, and the coated paper dried at 100–110° C. The paper was markedly improved in respect to resistance to wrinkling and tearing, and in its water, oil, and grease-resistance.

Example V

A sheet of tissue paper was drawn through a bath of the solution of the polyether resin of Example III, then through squeeze rolls to remove excess solution from the surface of the paper, and the sheet dried at 100–110° C. The product obtained was transparent, and had very markedly improved tear, water, oil and gasoline resistance.

The several methods of making the resins, and any of the ether resins disclosed in my co-pending application referred to above may be used in the practice of this invention. Thus, some of the useful phenols for making the resin, other than those mentioned above, include resorcinol, catechol, P,P'-dihydroxydiphenyl, dihydroxynaphthalenes, di(4-hydroxylphenyl)phenylmethane, di(4-hydroxy-3-chlorophenyl)dimethylmethane, di(4-hydroxyphenyl)sulfone and sulfide, etc.

Various polyhalides in addition to or instead of those mentioned may likewise be used to make the resin. Among these are $\gamma,\gamma'$-dichlorodipropyl ether, 1,4-dichlorocyclohexane, 1,4,7-trichloroheptane, dichlorodiethylamine, xylylene dibromide, propylene dichloride, glycerol-$\alpha,\gamma$-dichlorhydrin, hexamethylene dibromide, etc. Bromides and iodides are in many cases more active than the chlorides but are less economical. Apparently the only requisite is that the halogen atoms be sufficiently reactive to combine with the phenol, through the alkali salt of the phenol or some other common method for making ethers. It is a well known fact of chemistry that there are definite types of halogen atoms which are not readily hydrolyzed nor generally considered to be reactive, such as those attached to carbons which are joined in turn to other carbons by means of a double bond, an illustration being the chlorine atoms of vinyl chloride, and the halogen atoms attached to aromatic nuclei. Reactive halogen atoms, as the term is used herein, are therefore those which are attached to carbon atoms which in turn are joined to other atoms by means of only single bonds. Only polyhalides having two or more carbons are operable for making the polyether resins. The halogen atoms are preferably attached to different carbons to avoid the formation of acetol-like structures which, although of the ether-type, are more susceptible to hydrolysis.

By "polyhydric phenol", as used in the present specification and claims, is meant a phenolic body having at least two phenolic hydroxyls, the phenolic body being substantially unpolymerizable in that it is not readily converted on heat treatment to an infusible or insoluble product.

The resins mentioned above are, as disclosed in my co-pending application Serial No. 651,634 filed January 13, 1933, ether resins which may be defined structurally as having a recurrence of the grouping —X—O—Y—O— where X is a bivalent organic radical having its free valences directly attached to aromatic carbon atoms, O is oxygen, and Y is a bivalent organic radical having its free valences directly attached to singly bonded, non-aromatic carbon atoms. X may be an aryl group or it may have other substituents or components. The preferred resins obtained from dihydric phenols and dihalides may be formulated thus: —X—O—Y—O—X—O—Y—O—X—O—Y—O— ... and apparently contain substantially all of the structural units in linear chains. The resins are extremely resistant to chemical action including that of strong acids and alkalis. However, on very drastic treatment with strong hydrobromic or hydroiodic acids, such as long-continued boiling, the aromatic ether linkages can be split, although with difficulty, and a mixture of products comprising a polyhydric phenol and an aliphatic halide (of the type defined as being operable for making the resin) will be obtained.

As pointed out in my above mentioned co-pending application, the ingredients for making the ether resins may comprise a monohydric phenol and/or a monohalide. The ingredients (with or without the monovalent component) must however, be used in "polymerizing proportions", as this expression is defined in my co-pending application just referred to.

As a rule it is not necessary to add a plasticizer to the polyether resin because these resins are in themselves usually sufficiently flexible for the purposes of this invention. However, when a particularly flexible product is desired, a plasticizer may be added, such as a high boiling compound or mixture of compounds. Among suitable plasticizers are dibutyl phthalate, cyclohexyl butyl phthalate, diamyl phthalate, and the like.

The preferred solvents for the polyether resins are the aromatic hydrocarbons such as benzene, toluene, xylene, and the like. If desired, however, the aromatic hydrocarbon may be substituted in part by solvents such as aliphatic hydrocarbons, chlorinated hydrocarbons, and esters.

Any form of paper such as glassine, wrapping paper, high grade rag or linen paper, or any of the special highly porous absorbent papers used for impregnation may be employed in the practice of this invention.

The solutions of the polyether resins may vary in concentration within wide limits, depending both upon the method to be used in the treatment of the paper and the absorbency of the paper to be treated. For purposes of impregnation, I generally prefer to use dilute solutions, that is, solutions varying in concentration up to 20 to 25%, preferably not more than 5%. On the other hand, for purposes of coating, I prefer to use concentrated solutions, that is, varying up to 50 or 60% solids. In the case of certain of the polyether resins, such as those obtainable by reaction of di(3-methyl-4-hydroxyphenyl)dimethylmethane and $\beta,\beta'$-dichlordiethyl ether in the presence of alkali, products that are pliable, transparent, and highly moisture, grease, and oil-resistant can be obtained by application of the resin to the paper in the form of a hot melt.

The polyether resins used in the manufacture of the products of this invention may be combined with such materials as natural resins, as for example, rosin, congo, damar, and the like; natural resin acid esters, such as, ester gum; chlorinated naphthalenes, such as Halowaxes; chlorinated diphenyls; rubber; and various hydrogenated products such as hydrogenated rubber, hydrogenated rosin, and hydrogenated ester gum. Papers treated with the polyether resin in combination with hydrogenated resins have improved resistance to the deteriorating action of light.

The treated paper products of this invention are highly useful in the manufacture of waterproof and oil-proof containers, milk caps, shot shells, transparent wrapping paper, currency paper, washable wall paper, paper for electrical insulation, bookbinding material, etc.

A valuable property of my impregnated paper products is their transparency, a highly desirable property in paper not conferred by synthetic resins in general. Other outstanding and very desirable characteristics of the impregnated products is their high water-resistance, oil, and grease-proofness, pliability, markedly improved wet and dry strength, chemical inertness, and permanence of color.

As many apparently widely different embodiments of this invention may be made without departing from the spirit and scope thereof, it is to be understood that I do not limit myself to the specific embodiments thereof except as defined in the appended claims.

I claim:—

1. As a new article of manufacture paper treated with the resinous reaction product of a substantially unpolymerizable polyhydric phenol and an organic polyhalide whose halogen atoms are all attached to different carbon atoms, said carbon atoms being joined to other atoms by single bonds only.

2. As a new article of manufacture waterproof paper having a surface film of the resinous reaction product of a substantially unpolymerizable polyhydric phenol and an organic polyhalide whose halogen atoms are all attached to different carbon atoms, said carbon atoms being joined to other atoms by single bonds only.

3. As a new article of manufacture paper treated with a synthetic resin giving on long continued hydrolysis with hot hydrobromic acid, at least one substantially unpolymerizable polyhydric phenol and one organic polyhalide whose halogen atoms are all attached to different carbon atoms, said carbon atoms being joined to other atoms by single bonds only.

4. As a new article of manufacture paper impregnated throughout with the resinous reaction product of a substantially unpolymerizable monomeric polyhydric phenol and an organic polyhalide whose halogen atoms are all attached to different carbon atoms, said carbon atoms being joined to other atoms by single bonds only.

5. As a new article of manufacture, paper treated with the resinous reaction product of $\beta,\beta'$-dichlorodiethyl ether and di-(4-hydroxyphenyl)dimethylmethane.

JAMES AUGUSTUS ARVIN.